UNITED STATES PATENT OFFICE.

HALVOR HALVORSON, OF BOSTON, MASSACHUSETTS, ASSIGNOR TO H. HALVORSON AND JNO. T. HEARD.

IMPROVEMENT IN PROCESSES FOR DISTILLING ROSIN-OIL.

Specification forming part of Letters Patent No. 10,849, dated May 2, 1854.

*To all whom it may concern:*

Be it known that I, HALVOR HALVORSON, of Boston, in the county of Suffolk and State of Massachusetts, have invented or discovered a new and useful Improvement in the Manufacture of Oil from Rosin; and I do hereby declare that the same is described in the following specification.

The manner in which I produce oil from rosin consists in combining argil or clay with rosin in, or about in, the proportion of one part, by weight, of the rosin to five, or about five, parts, by weight, of the clay or argil, and subsequently subjecting the mixture to distillation in a proper distilling apparatus. The liquid result is a fine clear or slightly-colored oil, the proportion of which, by weight, to the rosin is not far from eighty per cent. The uses of this new product in the arts I have not as yet fully determined; but I have good reason to believe that either before or after undergoing a purifying process it may be employed to great advantage for the purposes of illumination, and for many purposes which common essential oil or spirits of turpentine are used.

The advantage of my discovery to those parts of the country where pine forests are resorted to for the purpose of procuring turpentine may be expected to be very great, as it is well known that the destruction of the pines for such purpose is taking place to a very great extent, and in case my rosin-oil can be used for most of the purposes to which common spirits of turpentine are devoted it must very much affect or lessen the number of trees destroyed in order to procure the native turpentine.

I am aware that it has been common in the distillation of rosin to mix it with alkalies, alkaline earths, or metallic oxides; also, that rosin and oil have been distilled from bricks and various other insoluble matters. I therefore do not claim any such mixtures of rosin for the purposes of distillation, as they do not have a specific action in the process that results from the employment of clay. I have found that in the use of clay no pitch residuum is left in the retort or distilling-vessel after distillation, whereas with any of the other matters above alluded to as having been mixed with the rosin I have found a large residuum of pitch remaining after distillation. The clay, therefore, I have discovered to have in some unknown manner a specific action on the rosin in preventing the formation of the pitch residuum.

What I claim as my invention is—

The combining clay with rosin and subjecting the mixture to distillation, so as to produce therefrom an oily product, substantially as specified.

In testimony whereof I have hereunto set my signature this 23d day of May, A. D. 1853.

H. HALVORSON.

Witnesses:
R. H. EDDY,
FRANCIS GOULD.